May 1, 1962  J. A. BURES ET AL  3,032,080

MEANS FOR CONTROLLING LIQUID FLOW

Filed April 17, 1958

INVENTORS
Joseph A. Bures &
Carl F. Wapiennik

*their attorneys*

_United States Patent Office_ 3,032,080
Patented May 1, 1962

3,032,080
MEANS FOR CONTROLLING LIQUID FLOW
Joseph A. Bures, R.D. 1, West Newton, and Carl F.
Wapiennik, Rostraver Township, Westmoreland County,
Pa. (R.D. 1, Belle Vernon, Pa.)
Filed Apr. 17, 1958, Ser. No. 729,209
3 Claims. (Cl. 141—297)

This invention relates to the controlling of liquid flow by passing it through capillary or thin-walled liquid passage means and is particularly useful in liquid filling and measuring applications.

This application is an improvement of our copending application Serial No. 653,703, filed April 18, 1957, now abandoned.

In controlling the flow of liquids, particularly into flasks, containers, and the like, it is frequently desired that the flow be automatically limited sometime in advance of overfilling. For example, in filling metal cans and tanks with liquid through a small opening, it is ordinarily necessary to use a funnel of some sort. The funnel blocks a view into the container and often results in over or underfilling of the container. Such a problem regularly exists, for example, in filling fuel tanks of small engines used for outboard motors, lawn mowers, and the like.

In other instances, it is frequently desired to measure a precise and known quantity of fluid into a container without contaminating the fluid in the container. Such a need is frequently met in chemical laboratories where it is desired to measure a precise amount into a flask or other standard container. The present practice requires that such fluids first be measured into a beaker which must then be emptied one or more times through a funnel into the container.

We have invented new and useful means for controlling liquid flow comprising a liquid conduit positioned for gravity flow of liquid therethrough and means forming liquid passage means therethrough of narrow width. We preferably provide means forming capillary liquid passage means within the liquid conduit. We prefer to provide a liquid conveying conduit extending downwardly into a container and a member placed concentrically within the conduit forming a narrow liquid passage between the inner wall of the conduit and said concentrically placed member. We preferably provide a flaring, upwardly extending liquid-receiving portion above the liquid conduit.

Other details, objects and advantages of our invention will become apparent as the following description of certain present preferred embodiments thereof proceeds.

In the accompanying drawings, we have illustrated certain present preferred embodiments of our invention in which FIGURE 1 illustrates a liquid conduit embodying our invention and projecting into a liquid container;

Figure 1:
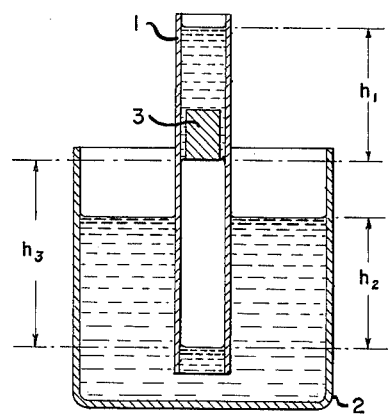
Figure 2:
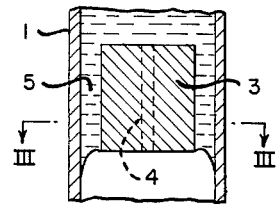
FIGURE 2 is an enlarged view of a portion of FIGURE 1.
Figure 3:
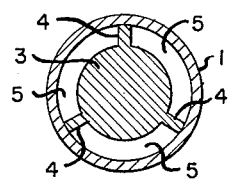
FIGURE 3 is a sectional view taken along line III—III of FIGURE 2.

Referring now to FIGURE 1, a tube 1 extends generally vertically into a liquid container 2. An insert 3 placed within tube 1 is maintained concentrically in the tube by spacers 4. The insert forms a narrow passageway 5 between the inner wall of tube 1 and insert 3. Although somewhat broken up by spacers 4, the passage is substantially continuous around the inner circumference of tube 1. The width of passage 5 is sufficiently narrow for marked capillary effects to be noticed. Thus, the liquid will generally assume the configuration shown in FIGURE 2 if it is not forcibly driven down by pressure from above. If a positive pressure from above is imposed upon the liquid, it will be driven through the passage. The width of the passage may vary for different liquids. The critical point is that for the given liquid, a passage of sufficiently narrow width must be used to preclude air bubbles from working their way upwardly against and through the liquid in the passage.

Figure 4:
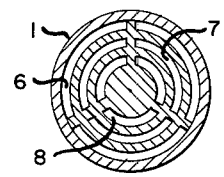
FIGURE 4 is a modified form of the view shown in FIGURE 3.

In FIGURE 4, an insert is shown in tube 1 having a plurality of passages 6, 7 and 8. The increased number of passages provides additional flow area but the width between the walls is not increased. The amount of flow may thereby be increased without changing the effective operation.

Figure 5:
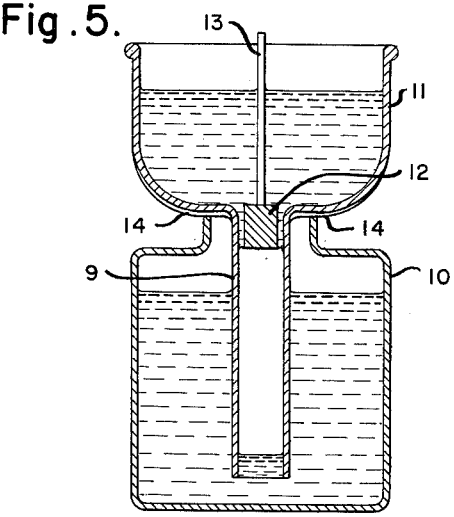
FIGURE 5 illustrates a funnel embodying our invention.

In FIGURE 5, a funnel for pouring into a container is shown. The funnel has a tube portion 9 extending into container 10 and has an enlarged mouth 11. An insert 12 is removably placed in the tube and is on a rod 13, whereby it may be removed from the tube. Fins 14 formed on the bottom of the mouth permit air to escape from the container.

Figure 6:
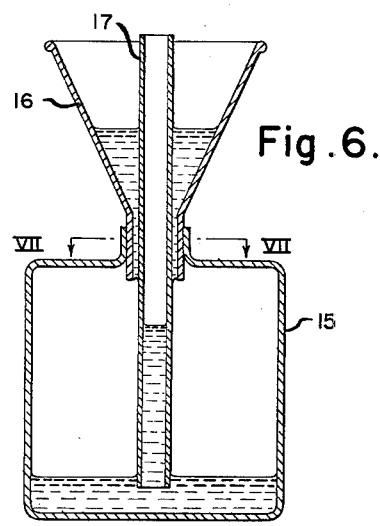
FIGURE 6 illustrates another form of funnel embodying our invention.
Figure 7:
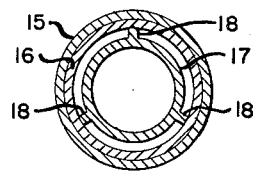
FIGURE 7 is a sectional view taken along line VII—VII of FIGURE 6.
Figure 7:
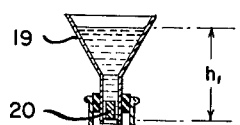

In FIGURE 6, a container 15 is shown having a funnel 16 placed therein. The funnel is tightly fitted to the container and forms a gas-tight seal. A hollow tube 17 extends downwardly through the funnel and is held concentrically by spacers 18. Tube 17 is frictionally held in position and may be moved upwardly.

Figure 8:
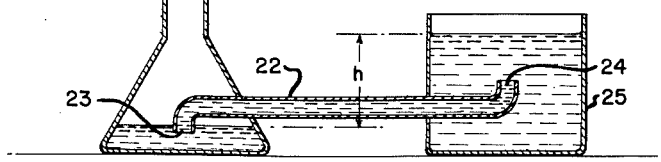
FIGURE 8 shows an application of our invention useful in maintaining a liquid level in a remote container.

In FIGURE 8, a funnel 19 having an insert 20 of the type previously described is placed tightly in the mouth of an intermediate container 21 to form a gas-tight seal. Transverse tube 22 terminates in a downwardly extending opening 23 in intermediate container 21 and in an upwardly extending opening 24 in container 25.

Referring now to FIGURE 1, if liquid is placed in tube 1 above insert 3, and it is assumed that container 2 is empty, liquid will flow downwardly through passage 5 and through the lower portion of tube 1 into container 2. When the liquid level in the container reaches the bottom of tube 1, the air in the lower portion of the tube will be sealed off, and there will be no further transfer of air in or out of the lower portion of the tube. The liquid will, however, continue to run downwardly until the pressure at the bottom of insert 3 equals the pressure tending to drive the liquid downwardly. At this point, flow will cease for the reason that the pressures will be equal. The air trapped in the lower portion of tube 2 will be unable to escape upwardly through the narrow passage 5. The point of equilibrium will be reached when $h_1$ and $h_2$ are equal. At this time the head of liquid in the upper part of tube 1 at the bottom of the air column will be equal, but will be exerted in opposite directions. It will be noted that $h_3$ is the height of the trapped air column. It is somewhat less than the length of the lower portion of tube 1 and represents the compressed volume of air trapped in the tube. The head produced by the trapped column of air is so small as to be negligible.

Referring now to FIGURE 5, the invention is shown used with a funnel for filling containers. Liquid is freely poured into the mouth 11 of the funnel until flow stops, and the funnel fills as is shown in FIGURE 5. The container is then substantially filled, but has space remaining in the top. Rod 13 may then be pulled upwardly, lifting insert 12 allowing air trapped in the tube 9 to escape and allowing the liquid in the funnel to drain into container 10. Where container 10 is, for example, an elongated fuel tank of a small gasoline engine, illustrated only in cross section, it will be understood that the additional fuel in the mouth 11 of the funnel will further fill container 10 but that there will not be sufficient fuel in the funnel to cause the tank to overflow. The proportions of the tube and funnel can readily be adjusted to meet necessary limitations.

In FIGURE 6, when liquid is placed in funnel 16, air escapes from container 15 through tube 17 until the liquid level in the container reaches the bottom of the tube. At this point, a liquid column is driven up tube 17 while liquid continues to flow downwardly from funnel 16 around the outside of tube 17. When equilibrium is established in the manner previously described, flow will stop, and the balance of liquid remaining in funnel 16 may be drained into container 15 by slidably moving tube 17 upward in funnel 16. The embodiment shown in FIGURE 6 may be readily adapted to precision measurements of liquid directly into a container in a simple manner by calibrating tube 17, employing graduations on funnel 16, and using them with a container of standard size. It will readily be seen that the total volume of fluid dispensed into container 15 will be that within the container, that standing in tube 17, and that which is held in funnel 16 when pouring stops. By proper calibration, a measuring device of high accuracy may be formed.

FIGURE 8 shows an embodiment of the invention for the filling of remote containers. Again, equilibrium will be reached when $h_1$ equals $h_2$. Container 25 may, for example, be one from which liquid is drawn at irregular intervals. By employing a float valve to supply liquid to funnel 19, the level of liquid in container 25 may be maintained substantially constant without further attention. As liquid is withdrawn from container 25, it will automatically be replaced.

From the foregoing, it will be seen that we have invented novel and useful means for controlling liquid flow. The parts may be made from laboratory glassware or they may be molded or extruded from plastic, or they may be formed in other well-known manners at a low price. The parts are not subject to wear, and no moving parts need be machined or fitted together. They may be readily cleaned and sterilized.

While we have illustrated and described certain presently preferred embodiments of our invention, it is to be understood that the invention is not so limited and may be otherwise variously practiced within the scope of the following claims.

We claim:

1. Means for quickly discharging a liquid into a container without overfilling the container comprising a liquid conveying tube extending downwardly into the container and having an enlarged liquid receiving portion at its upper end, liquid flow control means placed concentrically within the tube and forming a thin annular passage of relatively great depth between said control means and the inner wall of the tube, said annular passage being capillary for the liquid to be passed therethrough, and said tube being unobstructed below said control means.

2. Means for controlling liquid flow into a container comprising liquid receiving means terminating at its lower end in a liquid conveying tube which extends downwardly into said container, liquid flow control means fitted therein and forming at least one narrow annular passage within the tube between the liquid receiving means and lower portion of the tube, such passage being of relatively great depth compared to its width and being capillary for the liquid which is to be controlled.

3. Means for filling a container having a single opening comprising a liquid receiving member fitted in the opening and having a gas tight seal between the member and the container, a hollow tubular gaseous escape member having a relatively large opening extending upwardly through the opening in said member and an annular liquid passage of relatively thin width intermediate said escape member and the receiving member, said passage being of relatively great depth compared to its width and being capillary for the liquid which is to be passed therethrough.

References Cited in the file of this patent

UNITED STATES PATENTS

| | | |
|---|---|---|
| 104,575 | Golden | June 21, 1870 |
| 596,606 | Middlekauff | Jan. 4, 1898 |
| 721,870 | Edison | Mar. 3, 1903 |
| 989,300 | Schnarr | Apr. 11, 1911 |
| 990,549 | Hampel | Apr. 25, 1911 |
| 2,737,953 | Wiltein | Mar. 13, 1956 |
| 2,868,246 | Nelson | Jan. 13, 1959 |